United States Patent
Mejia Cobo (10) Patent No.: US 11,328,154 B2
(45) Date of Patent: May 10, 2022

(54) SYSTEMS AND METHODS OF INCREASING PEDESTRIAN AWARENESS DURING MOBILE DEVICE USAGE

(71) Applicant: Marcelo Alonso Mejia Cobo, Redmond, WA (US)

(72) Inventor: Marcelo Alonso Mejia Cobo, Redmond, WA (US)

(*) Notice: Subject to any disclaimer, the term of this patent is extended or adjusted under 35 U.S.C. 154(b) by 105 days.

(21) Appl. No.: 16/532,723

(22) Filed: Aug. 6, 2019

(65) Prior Publication Data

US 2021/0042524 A1 Feb. 11, 2021

(51) Int. Cl.
| | |
|---|---|
| *G06K 9/00* | (2022.01) |
| *G06T 7/50* | (2017.01) |
| *H04M 1/02* | (2006.01) |
| *G06F 3/01* | (2006.01) |
| *G01C 21/36* | (2006.01) |
| *G06T 7/70* | (2017.01) |

(52) U.S. Cl.
CPC ..... *G06K 9/00664* (2013.01); *G01C 21/3647* (2013.01); *G01C 21/3697* (2013.01); *G06F 3/013* (2013.01); *G06K 9/00362* (2013.01); *G06T 7/50* (2017.01); *G06T 7/70* (2017.01); *H04M 1/0264* (2013.01)

(58) Field of Classification Search
CPC ..................................................... G08G 1/005
See application file for complete search history.

(56) References Cited

U.S. PATENT DOCUMENTS

| | | | |
|---|---|---|---|
| 8,953,841 B1* | 2/2015 | Leblang | G06K 9/00671 |
| | | | 382/103 |
| 9,846,999 B1* | 12/2017 | Pickover | H04W 4/029 |
| 9,892,624 B2* | 2/2018 | Deuter | G08B 25/12 |
| 2003/0189755 A1 | 10/2003 | Okuno | |
| 2013/0162826 A1 | 6/2013 | Zhang et al. | |
| 2014/0111646 A1 | 4/2014 | Hamilton, Sr. | |
| 2014/0119718 A1 | 5/2014 | Oh et al. | |

(Continued)

FOREIGN PATENT DOCUMENTS

EP 3157233 4/2017

OTHER PUBLICATIONS

International Search Report and Written Opinion for PCT/US2020/045201, dated Oct. 26, 2020, 12 pages.

*Primary Examiner* — Hadi Akhavannik (74) *Attorney, Agent, or Firm* — Ray Quinney & Nebeker P.C.; John O. Carpenter (57) ABSTRACT

A mobile electronic device includes a video camera, a display, a processor, and a hardware storage device. The video camera is positioned on a first side of the mobile electronic device, and the display is positioned on a second side of the mobile electronic device opposite the first side. The processor is in data communication with the video camera and the display. The hardware storage device is in data communication with the processor. The hardware storage device has instructions stored thereon that, when executed by the processor, cause the processor to image a physical environment of the mobile electronic device using the video camera, display a video feed on the display in real time in a first portion of the display area, and display a second software application in a second portion of the display area while displaying the video feed in the first portion.

20 Claims, 6 Drawing Sheets

(56) References Cited

U.S. PATENT DOCUMENTS

| | | | |
|---|---|---|---|
| 2015/0077236 A1* | 3/2015 | Le Masurier | G08G 1/163 340/435 |
| 2015/0109149 A1* | 4/2015 | Duncan | G02B 27/017 340/944 |
| 2015/0179066 A1* | 6/2015 | Rider | G08G 1/04 701/31.5 |
| 2016/0057726 A1* | 2/2016 | Bai | H04W 4/029 340/686.6 |
| 2016/0091606 A1 | 3/2016 | Shin et al. | |
| 2016/0317811 A1 | 11/2016 | Greenberg et al. | |
| 2017/0109591 A1* | 4/2017 | Sakuragi | G01C 21/3676 |
| 2018/0114435 A1* | 4/2018 | Singh | G06F 3/0481 |
| 2018/0165976 A1* | 6/2018 | Mahnke | G08G 1/005 |
| 2018/0225513 A1* | 8/2018 | Bender | G06F 3/017 |

* cited by examiner

SYSTEMS AND METHODS OF INCREASING PEDESTRIAN AWARENESS DURING MOBILE DEVICE USAGE

BACKGROUND AND RELEVANT ART

Mobile electronic devices, such as smartphone, tablets, hybrid computers, and other handheld devices present users with visual information in a compact and convenient form factor. However, the visual nature of these devices can draw the user's attention away from the physical environment in which the users are moving. Users can encounter pedestrian hazards, such as fences, doors, or other people while walking or moving on sidewalks or hallways. Further, pedestrians can be at risk of collision from motor vehicles in crosswalks or parking lots. Allowing a user to view the physical environment while the user is viewing a display of the mobile electronic device can improve user safety.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a mobile electronic device includes a video camera, a display, a processor, and a hardware storage device. The video camera is positioned on a first side of the mobile electronic device, and the display is positioned on a second side of the mobile electronic device opposite the first side. The processor is in data communication with the video camera and the display. The hardware storage device is in data communication with the processor. The hardware storage device has instructions stored thereon that, when executed by the processor, cause the processor to image a physical environment of the mobile electronic device using the video camera, display a video feed on the display in real time in a first portion of the display area, and display a second software application in a second portion of the display area while displaying the video feed in the first portion.

In some embodiments, a mobile electronic device includes a video camera, a display, a processor, and a hardware storage device. The video camera is positioned on a first side of the mobile electronic device, and the display is positioned on a second side of the mobile electronic device opposite the first side. The processor is in data communication with the video camera and the display. The hardware storage device is in data communication with the processor. The hardware storage device has instructions stored thereon that, when executed by the processor, cause the processor to image a physical environment of the mobile electronic device within the field of view, identify a pedestrian hazard of the physical environment within the field of view, display a video feed on the display in real time in a first portion of the display area, highlight the pedestrian hazard on the video feed, and display a second software application in a second portion of the display area while displaying the video feed in the first portion.

In some embodiments, a mobile electronic device includes a video camera, an optical element, a display, a processor, and a hardware storage device. The video camera is positioned on a first side of the mobile electronic device, and the display is positioned on a second side of the mobile electronic device opposite the first side. The optical element is positioned optically in front of the video camera. The optical element includes at least one refractive surface to change a direction of incoming light toward the video camera. The processor is in data communication with the video camera and the display. The hardware storage device is in data communication with the processor. The hardware storage device has instructions stored thereon that, when executed by the processor, cause the processor to image a physical environment of the mobile electronic device, display a video feed on the display in real time in a first portion of the display area, and display a second software application in a second portion of the display area while displaying the video feed in the first portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a front view of a mobile electronic device with video feed presented a first portion, according to at least one embodiment of the present disclosure;

FIG. 2-2 is a back view of the mobile electronic device of FIG. 2-1, according to at least one embodiment of the present disclosure;

FIG. 8-1 through FIG. 8-3 illustrate a variety of example pedestrian hazards, according to at least one embodiment of the present disclosure;

FIG. 10-1 is a front view of a mobile electronic device indicating a potential pedestrian hazard outside the field of view of the camera and/or display, according to at least one embodiment of the present disclosure;

FIG. 10-2 is a front view of a mobile electronic device indicating a potential pedestrian hazard on a map display, according to at least one embodiment of the present disclosure;

DETAILED DESCRIPTION

This disclosure generally relates to electronic devices and methods of use. More particularly, this disclosure relates to mobile computing devices and other mobile electronic devices that users engage with while walking or otherwise moving outside of a vehicle (e.g., on a bicycle, skateboard, rollerskates). For example, the present disclosure can relate to a mobile electronic device that can provide forward visibility and/or visual indicators to a user while the user is looking downward at the mobile electronic device.

A mobile electronic device according to the present disclosure may provide a "passthrough" or other video feed of the user's path on the display of the mobile electronic device. By displaying a real time video feed on the display, the mobile electronic device can increase the user's safety by displaying environmental hazards physically outside of the user's field of view on a portion of the user interface that is within the user's field of view. The user can then react or respond to the environmental hazard and avoid harm or inconvenience while using the mobile electronic device.

In some embodiments, the mobile electronic device has a video camera with a field of view that can encompass objects or people in the user's path while the user is holding the device in front of them. In other embodiments, the mobile electronic device includes an optical element positioned in front of the video camera to redirect incoming light toward the video camera. For example, the mobile electronic device can include a periscope-like optical element that allows the video camera to image a forward path while the user holds the mobile electronic device flat in front of them. The video camera may conventionally image directly downward in such an example, while an optical element can allow the video camera to image the forward path, providing warning to the user of environmental hazards.

The mobile electronic device can display the imaged physical environment on the display of the mobile electronic device, such that the video feed is positioned within the user's peripheral vision. In some embodiments, the mobile electronic device can identify potential pedestrian hazards and the display can highlight those pedestrian hazards for the user. For example, the user may be looking down at the mobile electronic device while typing on, reading, or otherwise viewing the display of the mobile electronic device. The video feed is displayed on a first portion, for example, an upper portion, of the display while a second software application is displayed on a second portion of the display. The video feed can flash an identified pedestrian hazard to assist the user in recognizing the pedestrian hazard. The user can then view the video feed to avoid the pedestrian hazard or look up from the display to look at the pedestrian hazard to avoid the pedestrian hazard.

Figure 1:
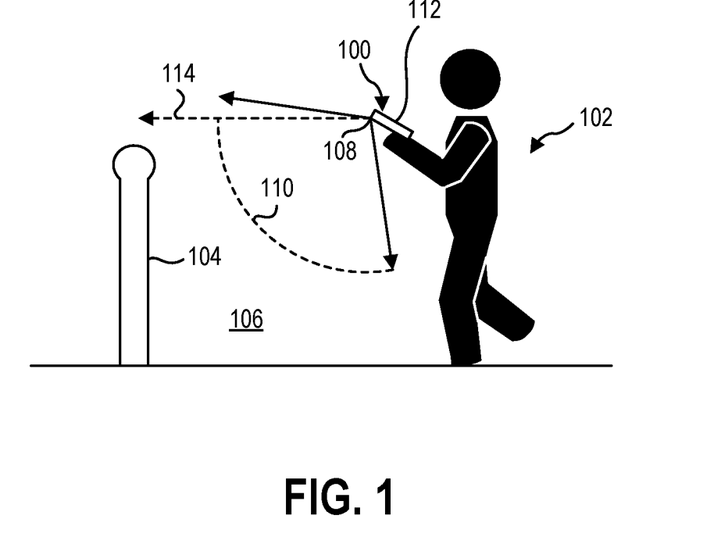
FIG. 1 is a side schematic view of a pedestrian user using a mobile electronic device in a physical environment including pedestrian hazards, according to at least one embodiment of the present disclosure.

FIG. 1 is an embodiment of a mobile electronic device 100 with improved safety for use while the user 102 is walking. A common problem for a user 102 of a mobile electronic device 100 is noticing and/or reacting to pedestrian hazards while the user's attention is trained on the display of the mobile electronic device 100. Mobile electronic devices 100 are frequently used while the user 102 is moving. Users 102 frequently walk into or are struck by other pedestrians, fences, doors, poles, or other pedestrian hazards 104 in the physical environment 106.

A mobile electronic device 100 according to the present disclosure includes a video camera 108 with a field of view (FOV) 110. The mobile electronic device 100 can display a video feed from the video camera 108 on a display 112 for the user to view. In some embodiments, the FOV 110 is sufficiently wide enough to image pedestrian hazards 104 in the physical environment 106. For example, the FOV 110 of the mobile electronic device 100 may be 120°, and when the user 102 holds the mobile electronic device 100 at a 45°-angle to the ground, the FOV 110 may extend 15° above the forward direction 114. In other examples, a 120° FOV 110 may only image the ground of the physical environment 106 when the user 102 holds the mobile electronic device 100 at a 30°-angle to the ground. In such examples, the mobile electronic device 100 can include an optical element positioned optically in front of the video camera 108 to reflect, refract, or otherwise alter the direction of incoming light to image more of the physical environment 106 in the forward direction 114.

Figure 21:
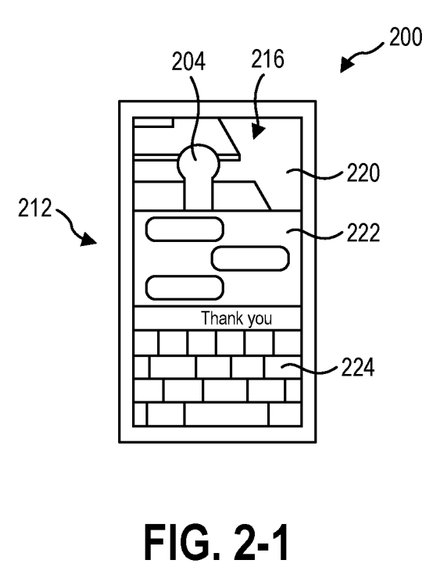

FIG. 2-1 is a front view of an embodiment of a mobile electronic device 200 according to the present disclosure. The mobile electronic device 200 has a display 212. The display 212 may be any display system that can provide a video display to a user. For example, the display can be an liquid crystal display (LCD), a light emitting diode (LED) display, an organic LED (OLED) display, a three-dimensional display, a touch-sensitive display, a curved display, a flexible and/or foldable display, include haptic feedback, any other display, or combinations thereof. For example, the display 212 may be a flexible touch-sensitive OLED display. In other examples, the display 212 may be a curved LED display with haptic feedback.

The display 212 presents a video feed 216 from the video camera (such as the video camera 108 described in relation to FIG. 1) on a first portion 220 of the display 212. The display 212 further presents a second software application on a second portion 222 of the display 212. In some embodiments, the first portion 220 displays a video feed 216 when the user selects an application and/or instructs the mobile electronic device 200 to display a video feed 216 in the first portion 220. In some embodiments, the first portion 220 displays a video feed 216 when the mobile electronic device 200 is held in a horizontal orientation. For example, the video feed 216 is displayed whenever the mobile electronic device 200 is used with the display in a range of preset or user selectable angles, such as between −45° and −45° of horizontal. In other examples, the first portion 220 displays a video feed 216 when the mobile electronic device 200 is held in a horizontal orientation and a GPS or other location-sensing device of the mobile electronic device 200 detects that the user and/or the mobile electronic device 200 is moving. The mobile electronic device 200 can measure the orientation of the mobile electronic device 200 with one or more sensors such as a gyroscope to measure rotation of the mobile electronic device 200 or an accelerometer to measure the orientation of the mobile electronic device 200 relative to the direction of gravity.

In some embodiments, the second software application displayed on the second portion 222 is a text-based communication application. For example, the text-based communication application may be a cellular text message application (e.g., SMS or MMS messaging). In other examples, the text-based communication application may be an email message application. In yet other examples, the text-based communication application may be an internet data-based text message application (e.g., WHAT'S APP, APPLE IMESSAGE, FACEBOOK MESSENGER, SKYPE).

In other embodiments, the second software application displayed on the second portion 222 is a video-based communication application. For example, the second software application may be a video chat or video call, such as APPLE FACETIME, SKYPE, etc. In other examples, the second software application displayed on the second portion 222 may be another video playback application that displays streamed or locally saved videos, such as YOUTUBE, MICROSOFT MOVIES, NETFLIX, HULU, etc.

In yet other embodiments, the second software application displayed on the second portion 222 is a navigation application. For example, the user may be viewing a navigation application that is providing real-time location and guidance information on a map on the second portion 222 while the first portion 220 provides a forward-facing view of the user's path, allowing the user to view the navigation application without compromising their awareness of hazards in their path.

In further embodiments, the second software application displayed on the second portion 222 is an internet browser or other internet-connected software application on the mobile electronic device 200. In still further embodiments, the second software application is any software application that displays visual information on the second portion 222.

In some embodiments, the first portion 220 is a percentage of the total area of the display 212 in a range having an upper value, a lower value, or upper and lower values including any of 20%, 25%, 30%, 35%, 40%, 45%, 50%, or any values therebetween. For example, the first portion 220 may be at least 20% of the total area of the display 212. In other examples, the first portion 220 may be less than 50% of the total area of the display 212. In yet other examples, the first portion 220 may be between 20% and 50% of the total area of the display 212. In at least one example, the first portion 220 may be about ⅓ of the total area of the display 212.

Figure 22:
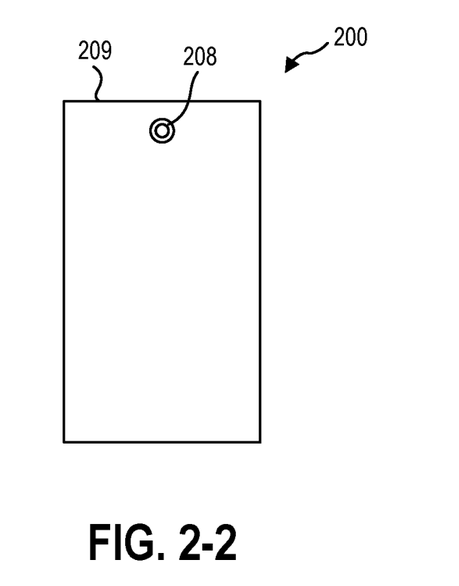

FIG. 2-2 is a back view of the second side of the mobile electronic device 200 described in relation to FIG. 2-1. In some embodiments, the video camera 208 is positioned on the second side of the mobile electronic device 200 opposite the display 212 illustrated in FIG. 2-1. In other embodiments, the video camera 208 may be positioned along or at a top edge of the mobile electronic device 200 to image in the forward direction while the mobile electronic device is held at or near a horizontal position. The video camera 208 may be a black and white camera, a red-green-blue (RGB) camera, other color camera, infrared camera, depth camera, or any other imaging sensor.

The video camera 208 may include one or more lenses to direct light toward an imaging sensor of the video camera 208. A FOV of the video camera 208 can be dependent on the lens and/or lens stack of the video camera. For example, the video camera 208 may have a fish-eye lens or other wide-angle lens that allows the video camera 208 to have a 180° FOV. In other examples, the video camera 208 may have a fixed lens or lens stack to determine the FOV. In yet other examples, the video camera 208 may have a movable lens or lens stack to adjust the FOV.

In some embodiments, the FOV of the video camera 208 is in a range having an upper value, a lower value, or upper and lower values including any of 90°, 100°, 110°, 120°, 130°, 140°, 150°, 160°, 170°, 180°, or any other value therebetween. For example, the FOV of the video camera 208 is greater than 90°. In other examples, the FOV of the video camera 208 is less than 180°. In yet other examples, the FOV of the video camera 208 is between 90° and 180°. In at least one example, the FOV of the video camera 208 is about 120°. The FOV of video camera 208 may be insufficient to measure a forward direction when the user is holding the mobile electronic device 200 at or near a horizontal position during use.

Figure 3:
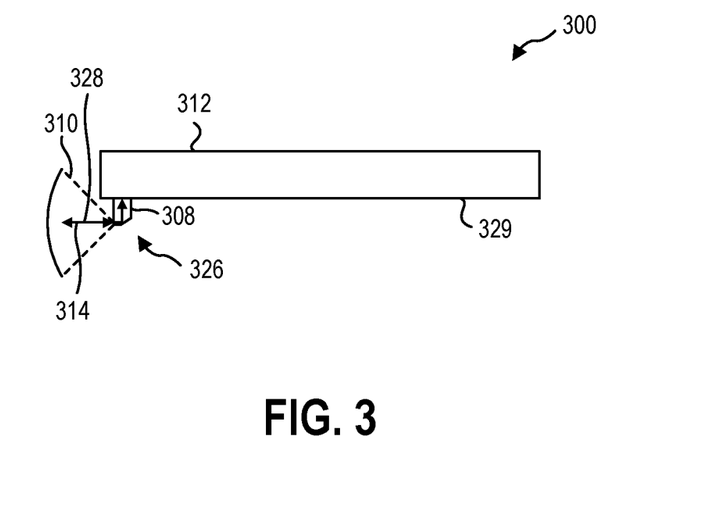
FIG. 3 is a side view of a mobile electronic device with an optical element positioned thereon to change a direction of field of view of the mobile electronic device, according to at least one embodiment of the present disclosure.

FIG. 3 is a side view of a mobile electronic device 300 with an optical element 326 positioned optically in front of the video camera 308. An optical element position optically in front of another should be understood to be in the optical path of light that is directed at the video camera 308. For example, while the optical element 326 is positioned below the mobile electronic device 300 when the mobile electronic device 300 is held horizontally, the optical element 326 alters the direction of the incoming light 328. The incoming light 328 is redirected by the optical element 326 toward the video camera 308. The optical element 326 is therefore optically in front of the incoming light 328 and the video camera 308.

The optical element 326 is any element that can reflect, refract, diffract, or otherwise alter the direction of the incoming light 328. For example, the mobile electronic device 300 of FIG. 3 is positioned horizontally with the video camera 308 oriented downward, but the FOV 310 is directed toward the forward direction 314 of the user's movement to image the environment in the forward direction 314.

In some embodiments, the FOV 310 is centered on the forward direction 314 when the optical element 326 is positioned optically in front of the video camera 308 and the mobile electronic device 300 is positioned horizontally. For example, a 90° FOV may have 45° above the forward direction 314 and 45° below the forward direction 314. In other embodiments, a majority of the FOV 310 is below the forward direction 314 when the optical element 326 is positioned optically in front of the video camera 308 and the mobile electronic device 300 is positioned horizontally. For example, a 90° FOV may have 40° above the forward direction 314 and 50° below the forward direction 314. In yet other embodiments, a majority of the FOV 310 is positioned above the forward direction 314 when the optical element 326 is positioned optically in front of the video camera 308 and the mobile electronic device 300 is positioned horizontally. For example, a 90° FOV may have 60° above the forward direction 314 and 30° below the forward direction 314.

In some embodiments, the video camera 308 is oriented an angle to a back surface 329 of the mobile electronic device 300 to direct the FOV 310 toward the forward direction 314 without the use of an additional optical element 326. In at least one embodiment, the video camera 308 is rotatable to adjust a FOV 310 relative to the mobile electronic device 300. In another embodiment, an optical element 326 is rotatable to adjust a FOV 310 relative to the mobile electronic device 300.

In some embodiments, the video camera of the mobile electronic device collects depth information for the field of view of the mobile electronic device. For example, the video camera 308 of the mobile electronic device 300 can include a structure light or time-of-flight illuminator that is in data communication with the video camera 308 and a processor of the mobile electronic device 300. The optical element 326 can be positioned optically in front of the video camera 308 and an illuminator such that the illumination (either time-of-flight or structured light) may be directed in the direction of the FOV 310 of the video camera 308.

Figure 4:
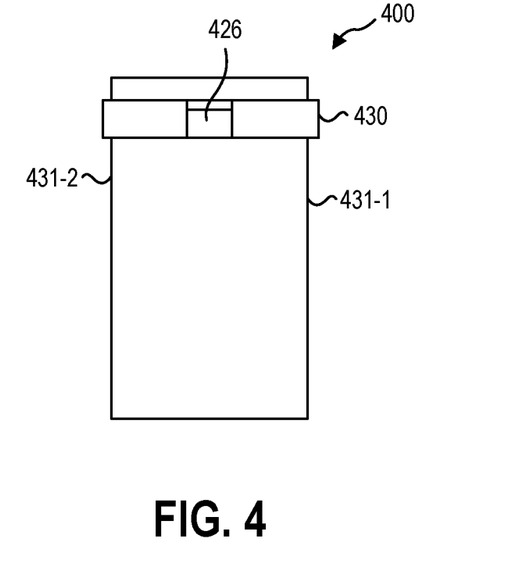
FIG. 4 is a back view of a mobile electronic device with a removable optical element selectively positionable over the camera of the mobile electronic device, according to at least one embodiment of the present disclosure.

In some embodiments, the mobile electronic device 300 has an optical element integrated into the mobile electronic device 300. FIG. 4 illustrates a rear view of an embodiment of a mobile electronic device 400 with a removable case 430 or support that selectively attaches an optical element 426 to the mobile electronic device 400. The example in FIG. 4 shows a case 430 that connects to the mobile electronic device 400 on the sides 431-1, 431-2 and supports the optical element 426 optically in front of a video camera. In other examples, the case 430 may be slidable along the sides 431-1, 431-2 to move the optical element 426 along the mobile electronic device 400 and video camera.

Figure 5:
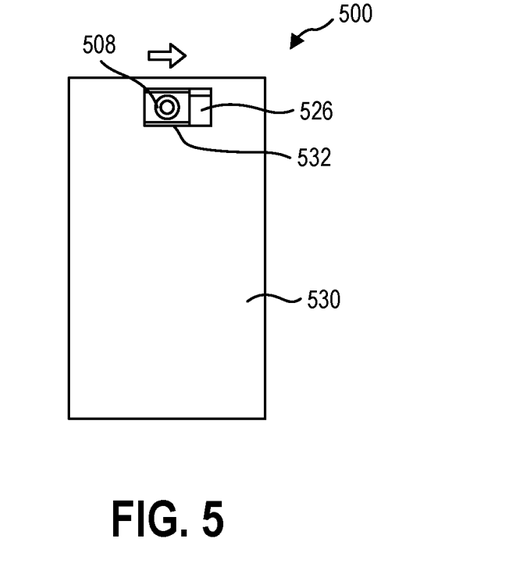
FIG. 5 is a back view of a mobile electronic device with a slidable optical element selectively positionable over the camera of the mobile electronic device, according to at least one embodiment of the present disclosure.

Referring now to FIG. 5, in other embodiments, the optical element 526 may be movable relative to the case 530, which is, in turn, fixed relative to the mobile electronic device 500. For example, the optical element 526 is movable along tracks 532 in the case 530. The optical element 526 is therefore movable from a first position optically in front of the video camera 508 (such as the position of the optical element 426 shown in FIG. 4) to a second position not optically in front of the video camera 508, as shown in FIG. 5. When in the second position, the optical element 526 allows conventional use of the video camera 508.

Figure 6:
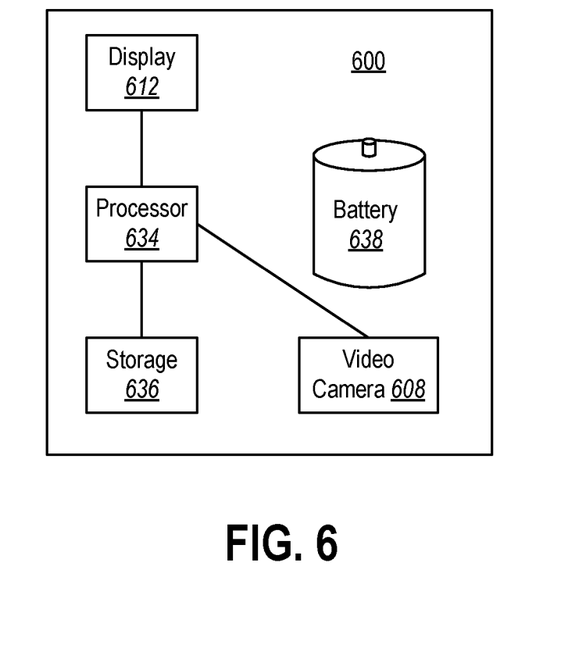
FIG. 6 is a system diagram of a mobile electronic device, according to at least one embodiment of the present disclosure.

FIG. 6 is a schematic representation of the mobile electronic device 600. The mobile electronic device 600 includes a processor 634 in data communication with the display 612. The processor 634 provides visual information to the display 612, which is subsequently rendered on the display 612 for the user. At least a portion of the visual information is a video feed from the video camera 608. The video feed is received by the processor 634 and a portion of (or the entirety of) the video feed is presented to the user on the display 612.

In some embodiments, the processor 634 provides the video feed at an operating system level. For example, the processor 634 may display the video feed on a first portion of the display 612 and displace the normal home screen, desktop, software applications, or other conventional visual information of the mobile electronic device 600 to a second portion of the display 612. In other embodiments, the processor 634 may display the video feed and another software application in a split-screen configuration. In yet other embodiments, the processor 634 may display a single software application that displays the video feed in a first portion and provides a second functionality, such as navigation, in a second portion of the display 612.

The processor 634 may further be in data communication with a storage device 636. The storage device 636 may be a hardware storage device, such as a platen-based storage device, a solid-state storage device, or other non-transitory or long-term storage device. The storage device 636 may have instructions stored thereon to perform one or more methods or portions of a method described herein. The mobile electronic device 600 may further include a battery 638 or other power supply to power the processor 634, display 612, video camera 608, and other electronic components of the mobile electronic device 600.

Figure 7:
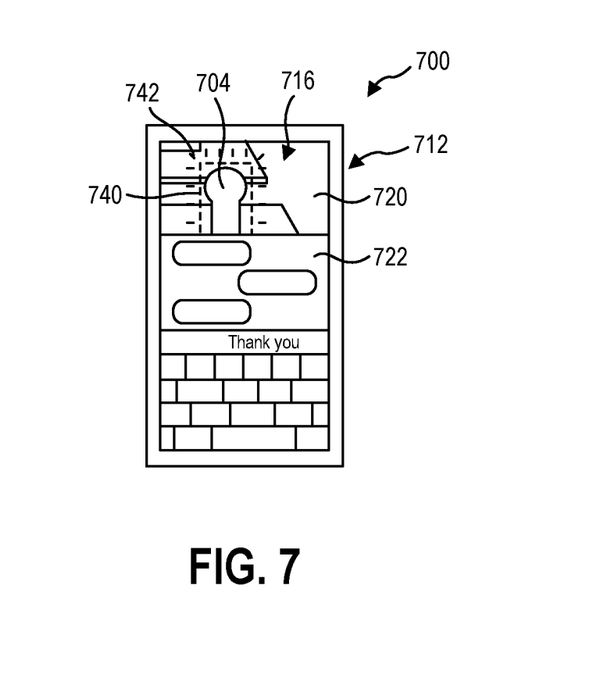
FIG. 7 is a front view of a mobile electronic device highlighting a pedestrian hazard on a display of the mobile electronic device, according to at least one embodiment of the present disclosure.

FIG. 7 illustrates an embodiment of a mobile electronic device 700 with a user interface displaying a video feed 716. The video feed 716 is displayed in a first portion 720 of the display 712. Positioning the video feed 716 of the forward direction can improve user safety by providing a view of pedestrian hazards or other objects within the user's peripheral vision. The amount of time needed for a user to view and identify objects on the first portion 720 of the display 712 while engaged with the second portion 722 is less than is needed to change the user's view from the display 712 to the forward direction (e.g., away from the mobile electronic device 700).

In some embodiments, the video feed 716 on the display 712 can further include one or more features to highlight a pedestrian hazard 704. For example, the mobile electronic device 700 can display a border 740 around the pedestrian hazard 704 in the video feed 716. In other examples, the border 740, outline, or other portion of the pedestrian hazard 704 may blink 742 to further highlight the pedestrian hazard 704 and draw the user's attention to the pedestrian hazard 704.

Figure 81:
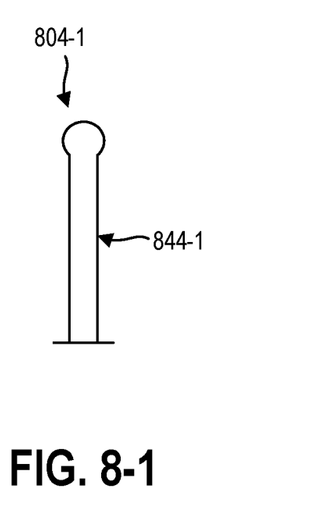
Figure 82:
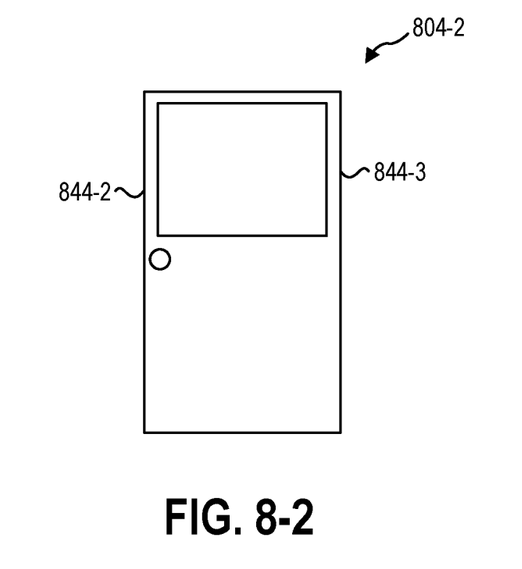
Figure 83:
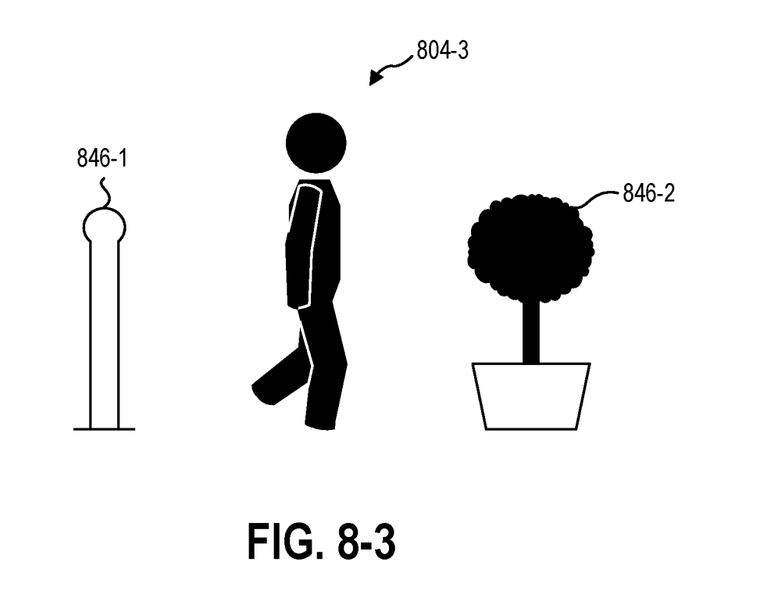

FIG. 8-1 through 8-3 illustrate examples of pedestrian hazard detection. FIG. 8-1 illustrates a first type of pedestrian hazard detection. In some embodiments, the processor of the mobile electronic device may use one or more edge detection algorithms to search for edges 844-1 in frames of the video feed provided by the video camera. For example, the edge detection may search for edges having a high contrast in the video feed. In one example, the edge detection may search for linear edges 844-1 having high contrast, such as using a Hough transform. In other examples, the edge detection may search for non-linear edges having high contrast by using a pixel kernel analysis to compare contrast levels at adjacent or nearby pixels to an origin pixel at the center of the kernel. In at least one example, the mobile electronic device may include an accelerometer, gyroscope, or other sensor that allows the mobile electronic device to determine the orientation of the mobile electronic device. The processor of the mobile electronic device may then determine the orientation of an edge relative to the position of the mobile electronic device and determine vertical or horizontal edges or surfaces.

FIG. 8-1 illustrates an example of a linear edge 844-1 that may be identified using a Hough transform. Identification of a linear edge 844-1 (e.g., vertical, horizontal, or diagonal edges) can allow the mobile electronic device to identify and highlight many common pedestrian hazards 804-1, such as a post, a low walls, benches, stairs, curbs, gates, or other objects a pedestrian may encounter with vertical supports or horizontal surfaces. In other examples, the pedestrian hazards 804-1 may be a movable or changeable object, such as a crosswalk signal. The mobile electronic device may provide different visual indicators for a crosswalk signal that displays a "Walk" signal versus a "Do Not Walk" signal. In at least one example, the mobile electronic device may provide a border around the "Walk" signal, and the border may flash when the crosswalk signal changes to a "Do Not Walk" signal.

FIG. 8-2 illustrates another example of a pedestrian hazard 804-2 that may be identified using a mobile electronic device according to the present disclosure. In some examples, edge detection may detect all vertical edges in the environment imaged in the video feed. However, not all vertical edges may be relevant to a user's safety. The processor of the mobile electronic device may perform edge detection on the video feed to identify edges, and then identify and/or highlight pedestrian hazards having edges that meet certain criteria.

For example, a criterion may be an object has parallel edges 844-2, 844-3. The parallel edges 844-2, 844-3 are more likely to identify the peripheral sides of a hazard or pathway in the forward direction of the user. For example, the parallel edges 844-2, 844-3 illustrated in FIG. 8-2 flank a door that may be a pedestrian hazard 804-2 in the path of the user. In other examples, parallel edges may identify the interior edges of an open doorway, through which the user may safely walk. In either situation, drawing the user's attention so that the user may look up from the mobile electronic device and increase the user's situational awareness can improve the user's safety.

In other embodiments, the edge detection may be used to detect non-linear edges or movement of an edge, for example, relative to stationary objects in the environment. FIG. 8-3 illustrates an example of a pedestrian hazard 804-3 that is a person walking. The moving pedestrian hazard 804-3 may be identified and/or highlighted differently from a stationary hazard 846-1, 846-2. The moving pedestrian hazard 804-3 may require a greater amount of user attention to avoid than the stationary hazards 846-1, 846-2 as the moving pedestrian hazard 804-3 requires more than a single glance at the video feed or up from the display of the mobile electronic device to avoid.

In such examples, or other examples, different pedestrian hazards may be highlighted differently depending on the category or type of the pedestrian hazard. In the prior example shown in FIG. 8-3, the moving pedestrian hazard 804-3 may be highlighted with a flashing perimeter around the moving pedestrian hazard 804-3 to help the user identify that the moving pedestrian hazard 804-3 is dynamic and changing. For example, a moving pedestrian hazard 804-3 can have a moving highlighting. The stationary hazards, such as the mailbox 846-1 or the plant 846-2 can be highlighted using a border (such as the border 740 described in relation to FIG. 7) that is stationary relative to the mailbox 846-1 or the plant 846-2, respectively.

In some embodiments, the video camera of the mobile electronic device collects depth information for the field of view of the mobile electronic device. The depth information can allow the mobile electronic device to highlight or otherwise inform the user of pedestrian hazards based on the relative distances to the object in the FOV of the camera. For example, the moving pedestrian hazard 804-3 is closer to the viewer in FIG. 8-3 than the mailbox 846-1 or the plant 846-2. The moving pedestrian hazard 804-3 can therefore be highlighted with a thicker highlighting or a flashing highlighting to prioritize the relative distance of the hazards.

In some embodiments, the depth information allows the mobile electronic device to identify a speed at which a potential hazard is approaching the user. For example, a bicyclist moving toward the user that is 10 meters away presents a more immediate hazard to the user compared to a pedestrian walking toward the user 10 meters away. A pedestrian hazard that is moving toward the user at a rate greater than a threshold value can prompt a highlighting on the display of the mobile electronic device.

Figure 9:
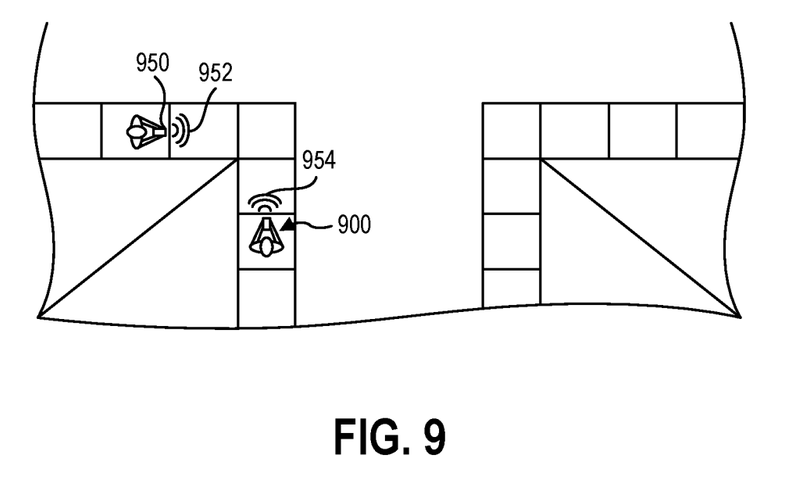
FIG. 9 is a top view of a detection of a second electronic device, according to at least one embodiment of the present disclosure.

FIG. 9 illustrates a scenario in which a user is viewing a mobile electronic device 900 while walking on a sidewalk. The user is approaching a corner of the sidewalk where the view to the side is obstructed by a building 948 or other object. The building 948 prevents the mobile electronic device 900 from imaging and/or detecting any potential pedestrian hazards behind the building 948. In some embodiments, a second user is carrying a second electronic device 950, and the second electronic device 950 emits a wireless signal 952. The wireless signal 952 is detected by the mobile electronic device 900 to identify and locate the second electronic device 950 without line-of-sight to the second electronic device 950.

In some embodiments, the wireless signal 952 is a WIFI signal. In some embodiments, the wireless signal 952 is a BLUETOOTH signal. In some embodiments, the wireless signal 952 is a near-field communication (NFC) signal. In some embodiments, the wireless signal 952 is another radio frequency (RF) signal that penetrates optically opaque objects.

The mobile electronic device 900 may communicate with the second electronic device 950 through a wireless communication request 954 that pings the second electronic device 950 for an electronic device identification (EDID) or other information about the second electronic device 950. Therefore, in addition to the location and/or movement of the second electronic device 950, the mobile electronic device 900 can inform the user of the nature of the second electronic device 950 approaching and/or located around the corner of the building 948.

Figure 101:
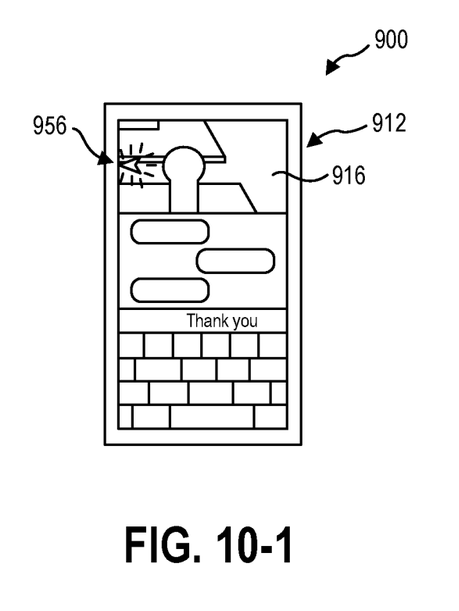

FIG. 10-1 is an example of a user interface of the mobile electronic device 900 of FIG. 9. The display 912 can present to a user a video feed 916 from a camera of the mobile electronic device 900. However, in the example described in relation to FIG. 9, the pedestrian hazard is located outside of the FOV of the camera and is not visible on the video feed 916. In such embodiments, an additional visual indicator and/or icon can be presented on the display 912 to indicate a location of a pedestrian hazard.

In some embodiments, such as illustrated in FIG. 10-1, a directional indicator 956 is overlaid on the video feed 916 or other portion of the display 912. For example, the directional indicator 956 may be an arrow or other shape that indicates a direction. In other examples, the directional indicator 956 may be a dot, a circle, another shape, a highlighted, animated, or flashing portion of a border of the display 912 and/or video feed 916 that indicates direction based on the location of the directional indicator 956 on the display 912 and/or the video feed 916. The directional indicator 956 is positioned at a border or periphery of the display 912 and/or video feed 916 to indicate direction relative to a center of the display 912 and/or video feed 916.

In some examples, the directional indicator 956 is present on the display 912 only when a pedestrian hazard is detected outside the FOV of the camera. In other examples, the directional indicator 956 is present on the display 912 when a second electronic device is detected.

In some embodiments, the directional indicator 956 further includes a distance indication. For example, the directional indicator 956 can include a distance value (e.g., 5 meters) positioned proximate to the directional indicator 956 to show the distance to the pedestrian hazard. In other examples, the directional indicator 956 changes size relative to a distance to the pedestrian hazard. For example, a directional indicator 956 increases in size on the display 912 as the pedestrian hazard approaches the mobile electronic device 900.

In some embodiments, the directional indicator 956 can flash to draw the user's attention. For example, the directional indicator 956 may flash when a pedestrian hazard is detected to alert a user to a new pedestrian hazard outside of the FOV of the camera and/or video feed 916. In other examples, the directional indicator 956 may flash when the pedestrian hazard is within a threshold distance to the mobile electronic device 900, such as when the pedestrian hazard is within 5 meters, within 3 meters, within 2 meters, or within 1 meter. While further threshold distances (e.g., 5 meters) would result in more notifications to the user, the greater quantity of flashing alerts might desensitize a user to the flashing alerts, while a shorter threshold distance (e.g., 1 meters) would indicate a more imminent collision with the pedestrian hazard.

Figure 102:
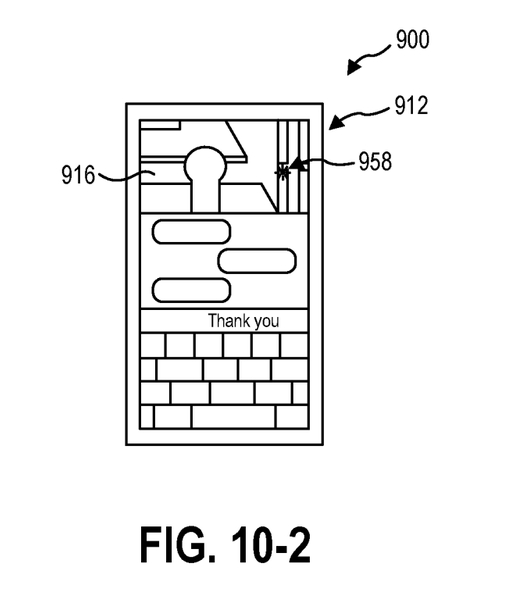

In other embodiments, the directional indicator 956 provides insufficient information to aid the user. For example, in narrow hallways, streets, or alleyways, a simple direction may be unclear as to the nature, speed, or location of the pedestrian hazard. FIG. 10-2 illustrates another embodiment of a user interface with a location indicator 958. The display 912 of the mobile electronic device 900 includes a map or other navigation panel as a location indicator 958. The location indicator 958 can, therefore, provide spatial context to the location of the detected pedestrian hazard.

In some embodiments, the mobile electronic device can detect and notify a user of audible pedestrian hazards. For example, a pedestrian hazard may be outside of the camera FOV of the mobile electronic device 900. The mobile electronic device 900 can have a plurality of microphones and/or a directional microphone to detect a sound of a potential pedestrian hazard. In some examples, a user may have impaired hearing or be wearing headphones or earphones, and the mobile electronic device 900 can visually present a directional notification and/or location notification to alert a user to an audible pedestrian hazard.

Figure 11:
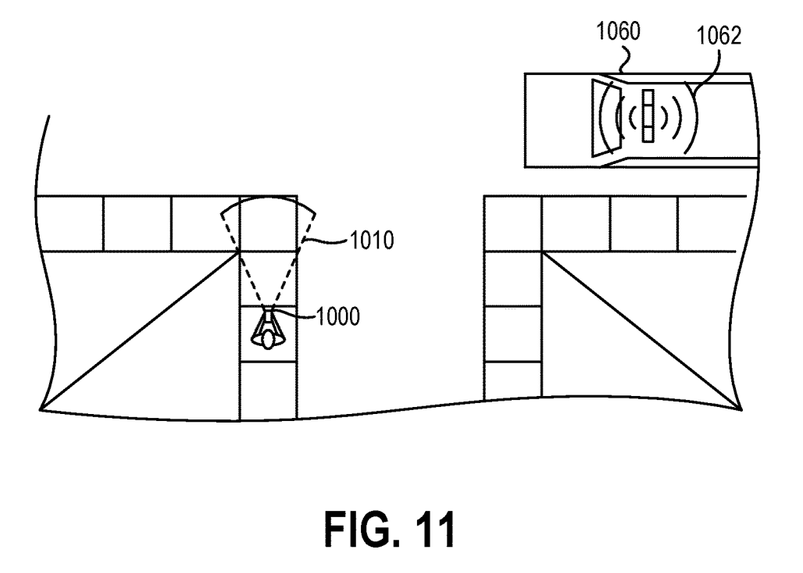
FIG. 11 is a top view of a detection of a potential pedestrian hazard by audio, according to at least one embodiment of the present disclosure.

FIG. 11 illustrates an example of a user walking with an embodiment of a mobile electronic device 1000. The mobile electronic device 1000 has a camera FOV 1010 that images potential pedestrian hazards. In some instances, a potential pedestrian hazard is located outside of the FOV 1010. For example, an emergency vehicle 1060 may be traveling at a high rate of speed and be dangerous to pedestrians. The emergency vehicle 1060 produces sound 1062 that may alert a hearing user to the presence and movement of the emergency vehicle 1060. In some embodiments, the mobile electronic device 1000 detects the sound 1062 of the emergency vehicle 1060 or other audible pedestrian hazards and can present a visual warning to the user.

Figure 12:
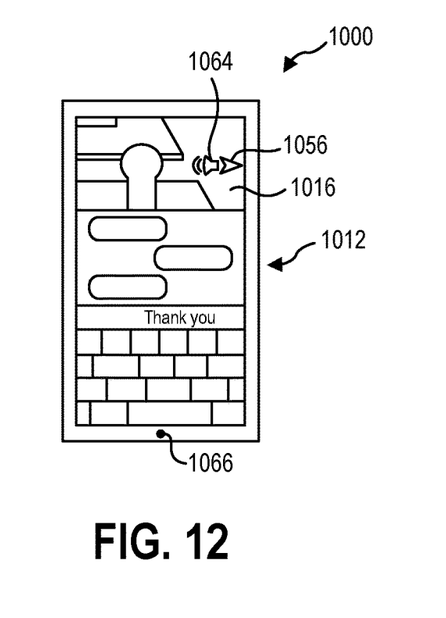
FIG. 12 is a front view of a mobile electronic device indicating detected audio of a potential pedestrian hazard outside the field of view of the camera and/or display, according to at least one embodiment of the present disclosure.

FIG. 12 is an example of a user interface of the mobile electronic device 1000 of FIG. 11. In some embodiments, the display 1012 of the mobile electronic device presents a directional indicator 1056 on the display 1012 and/or the video feed 1016. The directional indicator 1056 can be associated with a visual audio indicator 1064 to provide the user a visual indication that there is an audible pedestrian hazard not otherwise shown in the video feed 1016.

In some embodiments, a microphone 1066 of the mobile electronic device 1000 receives audio information from the audible pedestrian hazard. The display 1012 can then present the audio indicator 1064 in conjunction with a directional indicator 1056 to inform the user of the presence and direction of the pedestrian hazard.

In some embodiments, the microphone 1066 is a directional microphone to measure and provide a direction of the source of the detected sound. In other embodiments, the mobile electronic device 1000 includes a plurality of microphones 1066 to measure directionality of the detected sound. In some examples, the detected sound is compared to a database of known sounds, allowing the detected sound to be recognized by the mobile electronic device 1000.

In such examples, the display 1012 can provide further information to the user regarding the pedestrian hazard. For example, the detected sound may be recognized as an ambulance siren, and the audio indicator 1064 may include a graphical or text alert to inform a user that an ambulance siren is detected. In other examples, the detected sound is recognized and a pitch of the detected sound is compared to an expected pitch to determine whether the pedestrian hazard is approaching the mobile electronic device 1000, stationary relative to the mobile electronic device 1000, or moving away from the mobile electronic device 1000. For example, the Doppler effect will increase the pitch of an ambulance siren as the ambulance moves toward the microphone 1066 of the mobile electronic device 1000. In other examples, the Doppler effect will decrease the pitch of an ambulance siren as the ambulance moves away from the microphone 1066 of the mobile electronic device 1000. By providing a visual audio indicator 1064, the mobile electronic device 1000 can further improve the situational awareness of users with impaired hearing or users with headphones or earphones.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A mobile electronic device, the mobile electronic device comprising:
    a video camera positioned on a first side of the mobile electronic device;
    a directional microphone positioned on the mobile electronic device;
    a display positioned on a second side of the mobile electronic device opposite the first side;
    a processor in communication with the video camera, the microphone, and the display; and
    a hardware storage device in communication with the processor, the hardware storage device having instructions stored thereon that, when executed by the processor, cause the processor to:
        image a physical environment of the mobile electronic device;
        display a video feed on the display in real time in a first portion of the display area;
        display a location indicator of a pedestrian hazard relative to a user on a map in the first portion of the display area based on sounds detected by the directional microphone; and
        display a second software application in a second portion of the display area while displaying the video feed in the first portion.

2. The mobile electronic device of claim 1, the second software application being a text-based communication application.

3. The mobile electronic device of claim 1, the video feed being a top 50% or less of the field of view of the video camera.

4. The mobile electronic device of claim 1, the first portion of the display area being between 20% and 50% of the display area.

5. The mobile electronic device of claim 1, the first portion of the display area being resizable by the user.

6. The mobile electronic device of claim 1, the second software application being a video-based communication application.

7. The mobile electronic device of claim 1, the second software application being a navigation application.

8. The mobile electronic device of claim 1, further comprising:
    a user camera positioned on the second side of the mobile electronic device,
    wherein the user camera is a gaze detection camera, and the first portion of the display area is resizable based on gaze-location information.

9. A mobile electronic device, the mobile electronic device comprising:
    a video camera positioned on a first side of the mobile electronic device and having a field of view;
    a directional microphone positioned on the mobile electronic device;
    a display positioned on a second side of the mobile electronic device opposite the first side;
    a processor in communication with the video camera, the microphone, and the display; and
    a hardware storage device in communication with the processor, the hardware storage device having instructions stored thereon that, when executed by the processor, cause the processor to:
        image a physical environment of the mobile electronic device within the field of view;
        analyze the physical environment for a pedestrian hazard within the field of view;
        display a video feed on the display in real time in a first portion of the display area;
        receive audio information from the microphone;
        identify an audible pedestrian hazard not in the field of view;
        display a location indicator on a map on the first portion of the display based on sounds detected by the microphone outside of the field of view; and
        display a second software application in a second portion of the display area while displaying the location indicator in the first portion.

10. The mobile electronic device of claim 9, the pedestrian hazard including a person.

11. The mobile electronic device of claim 9, the pedestrian hazard including a crosswalk signal.

12. The mobile electronic device of claim 9, the pedestrian hazard being selectable by a user.

13. The mobile electronic device of claim 9, identifying the pedestrian hazard including determining movement of the pedestrian hazard relative to at least one element of the physical environment.

14. The mobile electronic device of claim 9, identifying the pedestrian hazard including detecting one or more edges of the pedestrian hazard.

15. The mobile electronic device of claim 9, highlighting the pedestrian hazard including flashing a visual indicator on the display.

16. The mobile electronic device of claim 9, identifying the pedestrian hazard including calculating a depth value of the pedestrian hazard to determine a distance to the pedestrian hazard from the mobile electronic device.

17. A mobile electronic device, the mobile electronic device comprising:
    a plurality of microphones positioned on a mobile electronic device;
    a display positioned on the mobile electronic device;
    a processor in communication with the plurality of microphones and the display; and
    a hardware storage device in communication with the processor, the hardware storage device having instructions stored thereon that, when executed by the processor, cause the processor to:
        receive audio information from the plurality of microphones;
        identify a location of an audible pedestrian hazard using audio information received by the plurality of microphones;

display a location indicator on a map on a first portion of the display based on audio information detected by the plurality of microphones; and display a second software application in a second portion of the display area while displaying the location indicator in the first portion.

18. The mobile electronic device of claim 17, further comprising identifying a movement direction of the audible pedestrian hazard using audio information received by the plurality of microphones.

19. The mobile electronic device of claim 17, further comprising comparing a detected sound to a database of known sounds and identifying a source of the detected sound.

20. The mobile electronic device of claim 19, wherein the location indicator includes a graphical or text alert based on the source of the detected sound.

* * * * *